United States Patent [19]

Schuster et al.

[11] Patent Number: 4,657,723

[45] Date of Patent: Apr. 14, 1987

[54] METHOD AND APPARATUS FOR DISTRIBUTING COOLANT IN TOROIDAL FIELD COILS

[75] Inventors: John R. Schuster, Encinitas; Char Y. Lee, Solana Beach; Carl F. Weggel, San Diego, all of Calif.

[73] Assignee: FDX Patents Holding Company, N.V., New York, N.Y.

[21] Appl. No.: 696,897

[22] Filed: Feb. 1, 1985

Related U.S. Application Data

[63] Continuation of Ser. No. 346,843, Feb. 8, 1982, abandoned.

[51] Int. Cl.[4] ............................................. G21B 1/00
[52] U.S. Cl. ................................. 376/146; 376/142; 335/300; 336/61
[58] Field of Search ................... 376/146, 142, 133; 335/300; 336/61, 62

[56] References Cited

U.S. PATENT DOCUMENTS

| | | | |
|---|---|---|---|
| 2,128,086 | 8/1938 | Gakle | 336/62 |
| 3,295,082 | 12/1966 | Kustom et al. | 335/300 |
| 3,437,965 | 4/1969 | Ragsdale . | |
| 3,859,615 | 1/1975 | Luton et al. . | |
| 4,116,264 | 9/1978 | Casali et al. | 376/142 |
| 4,174,254 | 11/1979 | Gaines . | |
| 4,268,353 | 5/1981 | Powell et al. . | |
| 4,277,768 | 7/1981 | Burgeson et al. . | |
| 4,363,773 | 12/1982 | Mine | 376/142 |
| 4,370,296 | 1/1983 | Bussard | 376/146 |

FOREIGN PATENT DOCUMENTS

| | | | |
|---|---|---|---|
| 0032,296 | 3/1978 | Japan | 376/142 |
| 0072998 | 6/1978 | Japan | 376/142 |
| 0072996 | 6/1978 | Japan | 376/142 |
| 0150590 | 11/1979 | Japan | 376/142 |
| 0158593 | 12/1979 | Japan | 376/142 |
| 1418319 | 4/1975 | United Kingdom . | |

OTHER PUBLICATIONS

Starfire ANL/FFP-80-1, vol. I, pp. 9-6 to 9-63 (§ 9.2.2).
Preliminary Conceptual Design Study of the Riggatron Approach to Fusion Power, Final Rept, vol. I, pp. 23-47.
CONF 740402—P1, vol 1, pp. 21-31, Bertoline et al—Prelim. Design of a Medium Size Technical Feasibility Tokamak Fusion Reactor.

Primary Examiner—Harvey E. Behrend
Attorney, Agent, or Firm—Schwartz, Jeffery, Schwaab, Mack, Blumenthal & Evans

[57] ABSTRACT

A coolant arrangement is disclosed for magnetic coil turn assemblies in which cooling fluid is flowed through a supply header along the face of a coil turn and into coolant inlet openings positioned along the face of the coil turn beneath the supply header structure. Coolant is directed through coolant channels around the magnetic coil turn, and into outlet openings. The outlet openings are in fluid communication with a return header also positioned on a flat face of a magnetic coil turn. There is also disclosed a method and apparatus for passing coolant through adjacent coolant channels in a magnetic coil turn in opposite directions. The cooling means disclosed avoids creating hot spots in the vicinity of the coolant inlets and outlets and reduces stresses in the coil in the vicinity of the coolant inlets and outlets. It also provides for maintaining a uniform average temperature throughout the coil turn. In addition, the cooling structure disclosed simplifies fabrication of the coil and is compact in nature so as to create favorable hydraulic and thermal conditions in environments where space limitations are crucial.

8 Claims, 9 Drawing Figures

METHOD AND APPARATUS FOR DISTRIBUTING COOLANT IN TOROIDAL FIELD COILS

This application is a continuation, of application Ser. No. 346,843, filed Feb. 8, 1982, now abandoned.

BACKGROUND OF THE INVENTION

1. Field of the Invention

This invention relates to a cooling arrangement for magnetic coils. This invention further relates to a cooling arrangement for a toroidal magnetic field coil assembly. More specifically, the present invention relates to a cooling arrangement for a toroidal field coil assembly for a tokamak fusion reactor. The invention further relates to a method of cooling an assembly of magnetic coils.

2. Background of the Invention

Positioned within the plasma fusion region of a tokamak reactor is a plasma which is composed of a mixture of positively charged nuclei and free electrons. To maintain purity and to prevent instability, the plasma cannot be allowed to contact any other matter. Thus, the core of the tokamak fusion reactor (TFR) is in a hermetically sealed vacuum chamber. In addition, means must be provided to prevent the fusible nuclei from touching any structural members or walls before they have had sufficient opportunity to collide and fuse. However, at temperatures in the range where fusion reactions will occur, the nuclei are moving so rapidly that they would traverse the distance between structural members or walls in the plasma fusion region in less than a microsecond.

Thus, a non-material means must be found to contain the plasma long enough for the nuclei to collide and fuse. One approach is to employ a magnetic field to confine the hot plasma. In a tokamak device, a circular ring of plasma is generated and maintained within a toroid-shaped region by the action of intense magnetic fields which themselves are shaped to form the toroid. The magnetic field acts as a non-material container liner that insulates the hot plasma from any walls or structural components of the tokamak. The magnetic field exerts an effective pressure on the contained plasma that is proportional to the square of the magnetic field strength. By maintaining this magnetic pressure at a greater value than the internal pressure of the plasma, containment is possible.

In order to develop a magnetic field of sufficient density and intensity to contain hot plasma, large amounts of power are used to energize the magnetic coils that comprise the toroidal field coil assembly. In spite of the fact that the coils are typically made of a high conductivity material, the large currents involved create very considerable amounts of Joule heat.

In addition, in a compact TFR, such as that disclosed in U.S. Pat. Nos. 4,367,193 and 4,363,775,; where the toroidal field coils are positioned adjacent to and surrounding the plasma fusion region, they experience considerable nuclear heating from the neutrons generated in the plasma fusion region. Thus, it becomes necessary to provide a means to cool the toroidal field coil turns to prevent their destruction.

Furthermore, in a compact TFR, the toroidal field (TF) coils are of a compact size, and in order to generate the required toroidal field must carry a very high current density. Furthermore, the compact size puts additional constraints on designing effective cooling arrangements for the TF coils.

It will be apparent that flowing coolant must be distributed in the toroidal field coil assembly of the compact TFR to remove the Joule and nuclear heat generated therein. The coolant must be distributed to the various cooling channels in the TF turns in such a way that the coolant distribution through the coil turns can be controlled to enhance the cooling characteristics.

In U.S. Pat. No. 4,116,264 to Farfaletti-Casali et al, a modular toroidal assembly for forming a blanket structure for a fusion reactor is disclosed. The coolant header structure for the blanket illustrated appears to consist of several large tubes branching off of a ring-shaped manifold and entering a partial ring structure containing many small cooling tubes. The header tubes of U.S. Pat. No. 4,116,264 do not communicate with any toroidal field coils along the sides of a coil turn nor do the cooling channels bend out of the plane of the coil turns to join the header tubes thereby allowing for applicant's thermal symmetry and reduced bulk material temperature variation. In fact, no toroidal field coil structure is even disclosed in U.S. Pat. No. 4,116,264. Therefore, the cooling channels of U.S. Pat. No. 4,116,264 cannot be an integral part of any toroidal field coil as is a feature of the present invention.

In U.S. Pat. No. 4,268,353 to Powell et al, there is disclosed a superconducting toroidal field coil assembly which contains cooling channels. However, those coils being both superconducting and located outside the region of the blanket and shield means are not subject to nuclear heating nor to intense Joule heat as are Applicants' TF coils. Moreover, the enormous size of those coils in comparison to the compact coils of the present invention renders the space required for cooling passages within them less crucial as a design consideration. Because of these looser design constraints, the coolant inlet passages of Powell et al are permitted to traverse the TF coil in a direction parallel to the flat face of the coil. Such a design would be unacceptable in a compact device since it would entail the removal of relatively large amounts of coil material in a local region. This in turn would result in hot spots and high stresses.

Burgeson et al in U.S. Pat. No. 4,277,768 disclose coolant means for their TF coil, each channel of which completely traverses the TF coil from the inner contour to the outer contour thus requiring the creation of large voids for coolant flow in the TF coil which, as explained above, would be unacceptable in Applicants' compact device. Such a design is possible in the device of Burgeson et al because of the massive size of the coils, the location of the coils remote from the plasma region, and the use of superconducting TF coils.

SUMMARY OF THE INVENTION

It is, therefore, an object of the invention to provide a cooling arrangement for magnetic coils.

It is an additional object of the invention to provide a cooling arrangement for cooling a magnetic coil assembly consisting of a plurality of magnetic field coils.

It is a further object of the invention to provide an arrangement for cooling the toroidal field coil assembly of a tokamak fusion reactor.

It is a still further object of the invention to provide a method for cooling magnetic coil turns.

It is a still further object of the invention to provide a method of cooling toroidal field coil turns in the toroidal field coil assembly of a tokamak reactor.

It is a still further object of the present invention to provide a method and apparatus for distributing coolant to a toroidal field coil that will result in near thermal symmetry and reduced bulk material temperature variation in the circumferential direction around individual coil turns.

The above objects and others are accomplished in the present invention by means of the use of header structure positioned on the side face of flat-washer shaped magnetic coil turns. The header structure, positioned on the side face of the coil turn, utilizes the gap or space between adjacent turns and is located outside of the body of material that physically constitutes the coil turn. Preferably, the coolant channels located within the magnetic coil turn bend toward the flat face of the coil turn to intersect the header structure at coolant inlets and coolant outlets. The header structure may be of a semicircular cross-section for pressure containment enhancement and for transitioning into a round tube or manifold that may be used to supply and withdraw coolant from the main coolant source. The header structure may preferably be tapered or otherwise shaped to accommodate itself to space limitations and also to control the flow distribution into and out of the coolant channels. It is apparent that geometries other than semicircular could be used to construct the coolant channel headers. For instance, the channel headers could be rectangular, square or elliptical as well as other cross-sections that would suggest themselves to one of skill in the art. Preferably, the headers are welded or brazed to the coil turn to provide a strong and leak-tight joint. The method and apparatus may use coolant headers on both sides of a coil turn to serve parallel cooling channels that alternate with respect to coolant flow direction.

In another aspect of the invention, a cooling arrangement as described above is provided to cool the TF coil turns of a tokamak reactor. Each TF coil turn is provided its own supply and return header and has within it cooling channels beginning at a coolant inlet opening and terminating at a coolant outlet which are respectively in fluid communication with the supply header and the return header. The coolant channels bend towards the flat surface of the TF coil turn to form the inlet and outlet openings thus minimizing the amount of void space due to coolant channels in the TF coil turn. Preferably, the supply header and the return header are configured such as to optimize the coolant flow distribution through the channels and the coolant inlet and outlet openings are positioned adjacent to the joint between consecutive TF coil turns.

Also in accordance with the present invention, a method is disclosed of flowing coolant through supply headers into coolant inlet openings in a TF turn, through the TF turn coolant channels, out of the outlet terminals and into a return header. The method in accordance with the present invention positions the supply header and the return header along a flat face of the TF coil turn.

In accordance with another aspect of the present invention, substantial variations in the bulk temperature of the coil turn are reduced by providing coolant headers on the sides of coil turns and parallel cooling channels within the coil turns that are served by the headers. The coolant flow in the parallel channels alternates with respect to coolant flow direction. Large temperature variations in toroidal field coils are undesirable inasmuch as those variations cause a greater coil maximum temperature than would a more uniform bulk temperature. In addition, a higher bulk temperature lowers the substantial structural strength of the coil. Moreover, temperature variations around the coil cause distortions and unequal thermally-induced growth in the coil. This growth can result in structural deflections which, if resisted, will cause stresses.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification of the present invention together with the description, serve to explain the principles of the invention. In the drawings.

DETAILED DESCRIPTION OF THE PREFERRED EMBODIMENTS

Reference will now be made in detail to the present preferred embodiment of the invention, an example of which is illustrated in the accompanying drawings.

Figure 1:
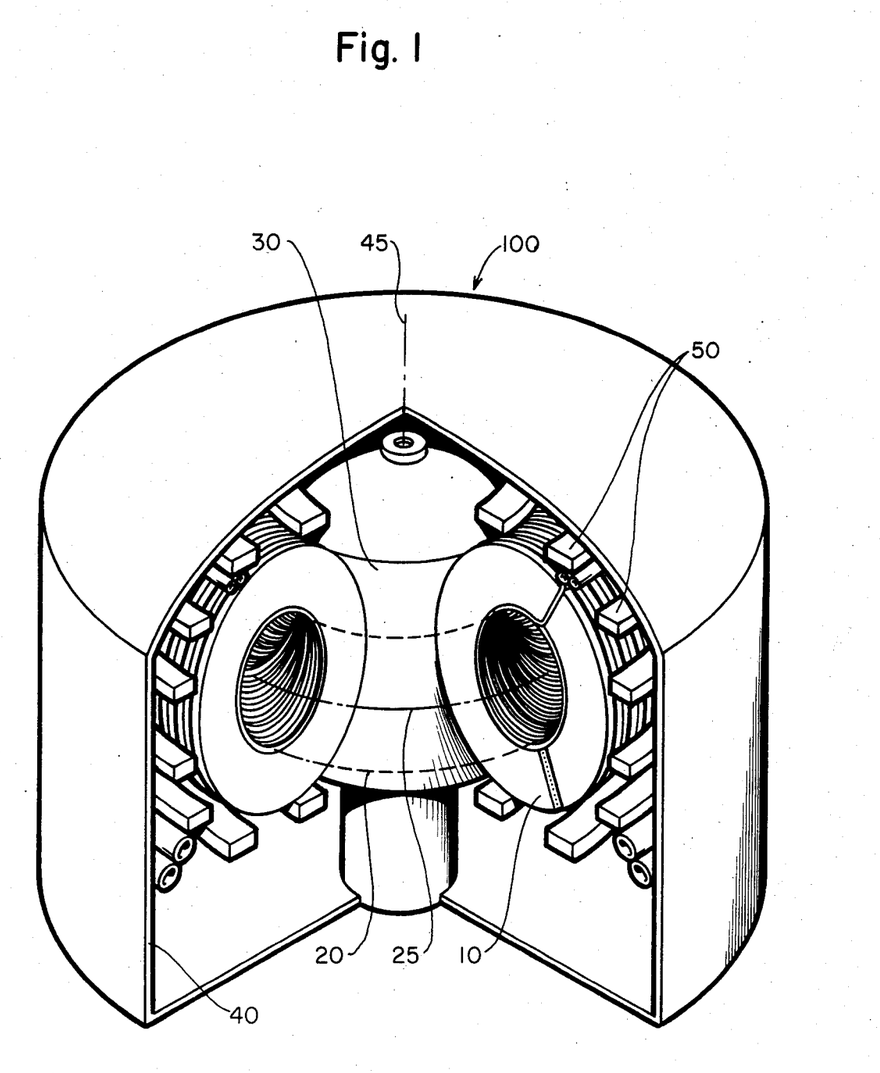
FIG. 1 is a perspective cutaway view of a compact toroidal reactor in accordance with this invention.

In FIG. 1, there is depicted a tokamak reactor 100 having a TF coil assembly 10 surrounding a toroidal plasma region 20 having a toroidal axis 25. For purposes of illustration, the ohmic heating transformer coil 30 is shown disposed about a central axis 45 and located coaxially interior to the TF coil assembly 10. The tokamak core is located within a vacuum chamber 40 and as will be appreciated by one of skill in the art, has several poloidal field coils 50 in addition to the ohmic heating coil 30 which perform various necessary functions to confine, heat, locate and stabilize the plasma in the plasma region 20.

The TF coil means 10 are energized by a power source (not shown) which forms no part of the instant invention, but which when operating causes very large current densitites to flow through the toroidal field coil turns. These high current densities cause Joule heating to occur in the toroidal field coil assembly. In addition, during operation, the plasma in the plasma region 20 radiates both thermal heat and energetic neutrons; the energetic neutrons being an additional source of heat. Because of the above-referenced heating effects, it is necessary to cool the TF coil turns. However, the coils must be cooled in such a manner as to take into account the problem of pressure drop and flow distribution. In addition, the cooling arrangement must not create an excessive void fraction in the TF coil or create excessive material stresses or hot spots associated with getting coolant into and out of each turn of the toroidal field coil.

Figure 2:
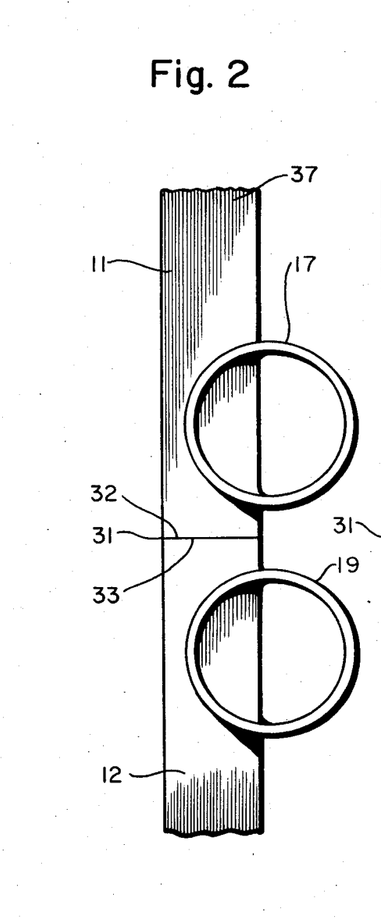
FIG. 2 is a partial side view of the region surrounding a joint between two coil turns.
Figure 3:
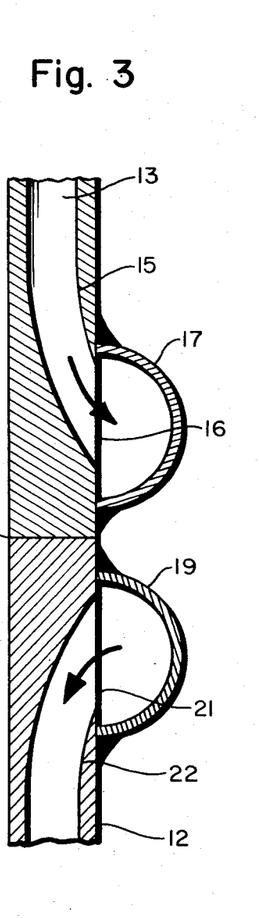
FIG. 3 is a partial cutaway view of the region surrounding the joint between two coil turns.
Figure 4:
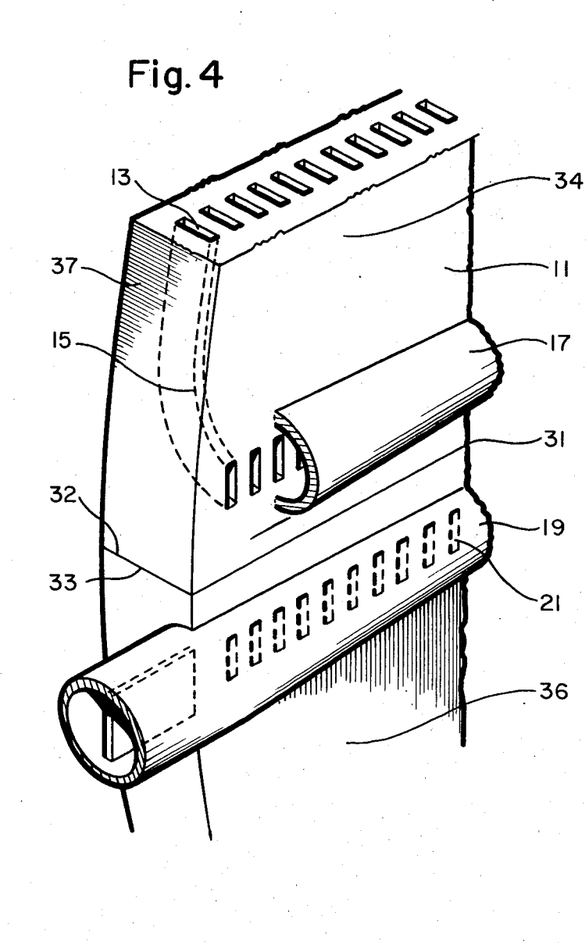
FIG. 4 is a perspective, partial cutaway view of the cooling arrangement in accordance with the invention.

Turning to FIGS. 2, 3 and 4, it can be seen that the TF coil turns are composed of generally flat washer-like disks 11 and 12 joined at a joint 31. The disks have a relatively narrow thickness along the edge 37 as compared to the flat faces 34 and 36. Each coil has a leading end and a trailing end as indicated by numerals 33 and 32, respectively, for coils 12 and 11, respectively. The trailing end 32 of coil 11 is joined at joint 31 with the leading end 33 of coil 12. It is in this manner that the toroidal field coil assembly 10 as shown in FIG. 1 is formed.

It will be appreciated by the artisan that in the compact TF coil assembly of the present invention, to provide coolant supply and return headers inside the body of the coil material which were wide enough to allow for coolant flow without unduly high pressure drop and high velocity, would create a void in the TF coil material of such magnitude as to cause electric current bunching in the region of the header (thus creating unduly large $I^2R$ losses) in addition to very high material stresses.

Therefore, in accordance with the present invention, the coolant supply header 19 and coolant return header 17 are positioned along the flat sides 36 and 34 of the TF coil turns 12 and 11, respectively. These headers are positioned just above and below the joint 31. The coolant channels 13 bend outward in the vicinity of the headers 19 and 17 to form inlet openings 21 and outlet openings 16 which, as seen in FIG. 4, are arranged radially to the axis of the tokamak. The general area of the bends is indicated in FIG. 3 by numerals 15 and 22. While the inlet and outlet openings are indicated in FIG. 4 to be rectangular, it will be appreciated by the artisan that they can be circular, elliptical, square or other convenient geometric shapes.

The distribution of coolant flowing through the individual coolant channels within each coil turn is affected by the relative pressure drops in the channels and by the pressure drop characteristics of the supply and return headers. Therefore, as shown in FIG. 4, it may be necessary to taper the headers, especially the supply header, so that the flow area decreases, with decreasing radial location from the axis of the tokamak. Tapering the headers also may be desirable in order to maintain clearance between the header and the adjacent TF coil turn.

Because the coolant channels 13 bend outward to meet the header structures above and below the joint 31, the present invention avoids the creation of a large void in the region of the joint 31 and the attendant current bunching and high-stress situations.

The headers may preferably be cut from round tubes, sections of which are then cut out to conform to the TF coil turns and attached by welding or brazing to the TF coils in such a manner as to enclose the coolant channel inlet and outlet openings. Since the header structure can be welded or brazed to the coil turn after each turn is machined, the fabrication of the coil turn is simplified.

In addition, it should be appreciated that while the inlet and outlet header structure depicted is circular, it can alternatively be made of any convenient geometric shape such as elliptical, square or rectangular or can be conformed to accommodate space limitations between turns.

Figure 5:
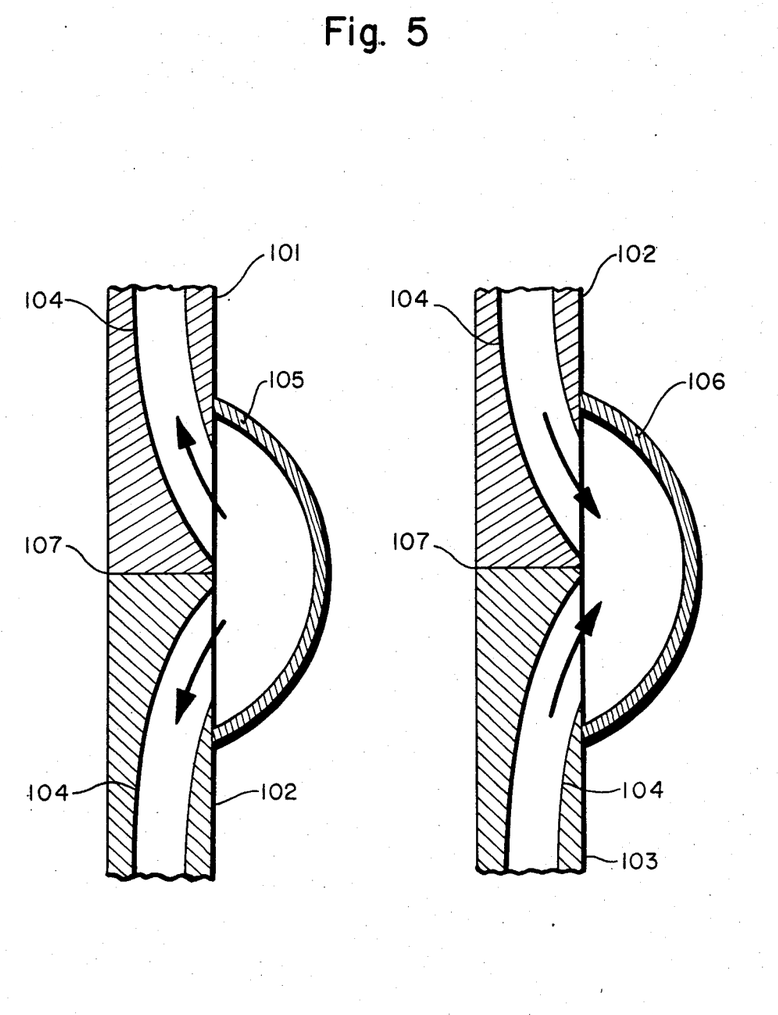
FIG. 5 is a partial cutaway view of the region surrounding the joint between two coil turns of another embodiment of the invention.

Another embodiment of this invention is shown in FIG. 5. TF coil turns 101, 102 and 103 having coolant channels 104 are served by common supply and return headers 105 and 106, respectively, that overlap the joint 107. For this configuration, the coolant flow direction within the coolant channels may preferably alternate from one TF coil turn to the next. This embodiment has the advantages of a uniform temperature within the region of the joint and it halves the required number of headers from, for example, the embodiment of FIG. 3.

In the embodiments shown in FIGS. 2, 3, 4, and 5, the coolant flows into the coil turn at one location, flows all the way around the coil turn picking up heat and then flows out at another location. While the embodiments described above have many useful advantages, it will be understood by the artisan that there will exist a substantial variation in the bulk temperature of the coil turn in the direction of coolant flow, i.e., the turn will be at a higher temperature near its coolant outlet than at its coolant inlet. As explained hereinabove, this gives rise to several undesirable characteristics such as high maximum coil temperatures, lower coil strength, deflections and stresses.

Figure 6:
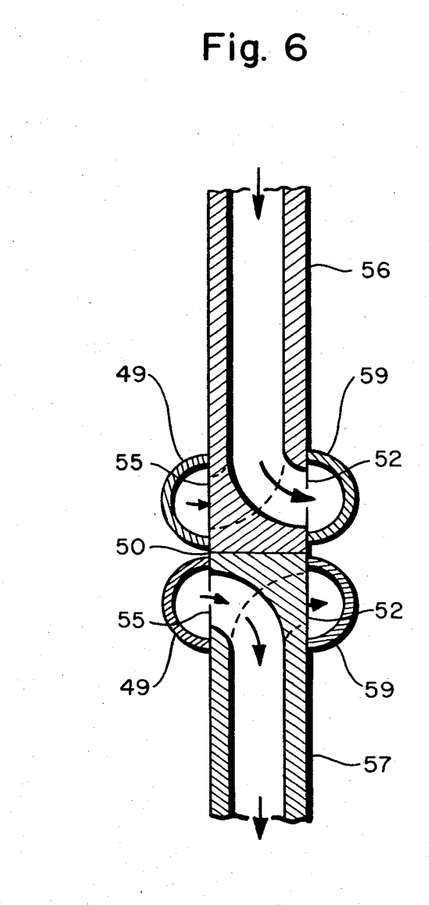
FIG. 6 is a partial side view of the region surrounding a joint between two coil turns of another embodiment of the invention.
Figure 7:
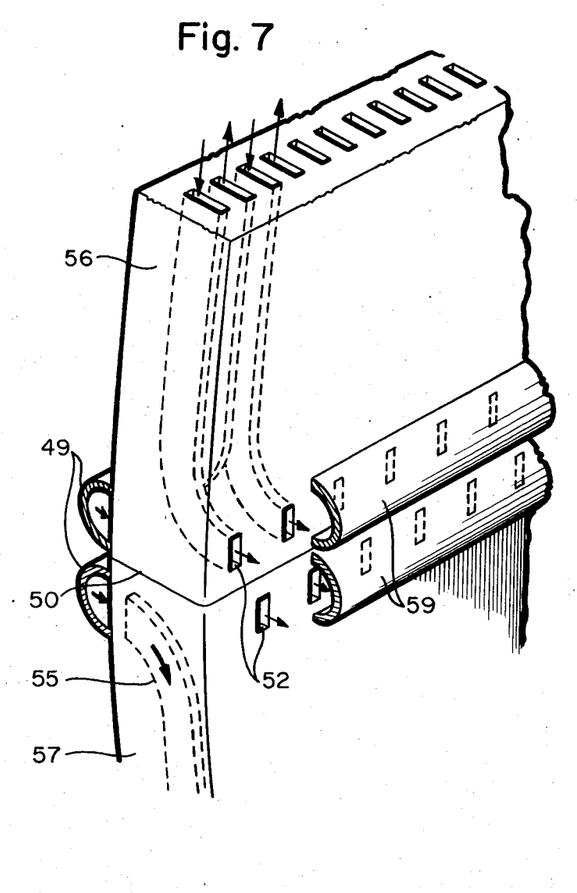
FIG. 7 is a partial, perspective cutaway view of the embodiment of FIG. 6.

Turning to FIGS. 6 and 7, side supply headers 49 are positioned on both sides of a joint 50 between adjacent coil turns 56 and 57. As best seen in FIG. 7, each supply header 49 supplies every other coolant channel 55 and each return header 59, services every other coolant channel 52. The result is a cooling arrangement where within each turn of the coil the cooling channels alternate with respect to the direction of coolant flow. Therefore, at any circumferential location around a coil turn, a cut across the coil would yield approximately the same average coil material temperature for the material surrounding two adjacent cooling channels. An additional embodiment requiring only half the number of headers and connections is depicted in FIGS. 8 and 9 wherein a single header is used which overlaps the joint between two coil turns, thus serving both turns simultaneously.

Figure 8:
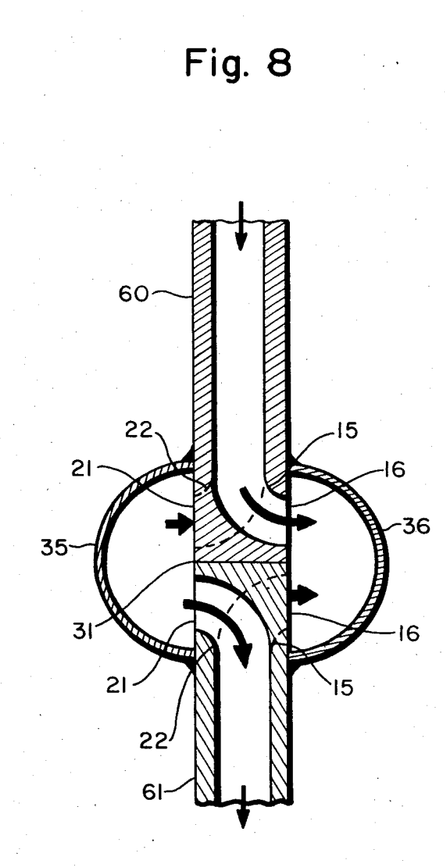
FIG. 8 is a partial, side view of the region surrounding a joint between two coil turns of another embodiment of the invention.
Figure 9:
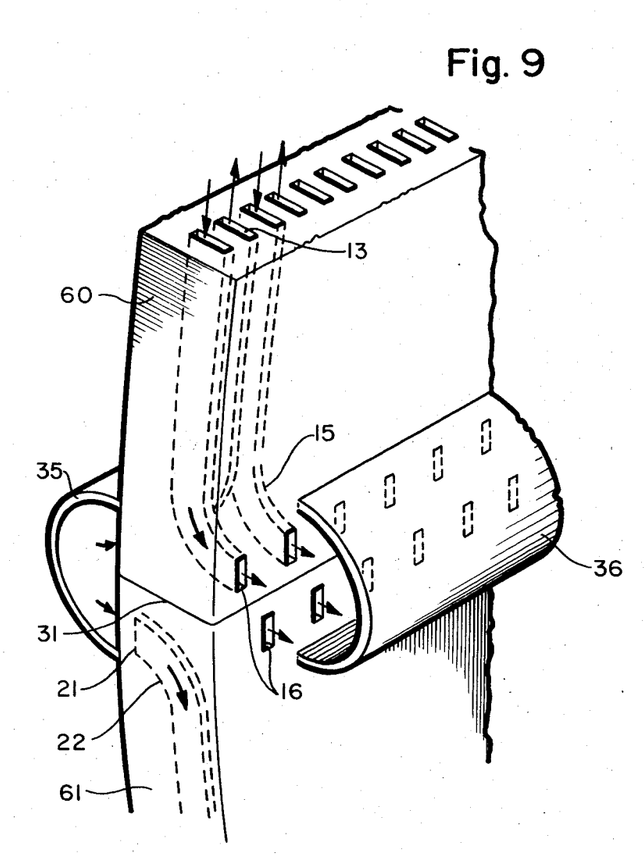
FIG. 9 is a partial, perspective cutaway view of the embodiment of FIG. 8.

Turning now to FIGS. 8 and 9, there is depicted a single supply header, 35 which covers the coolant inlet openings 21 in two adjacent coils 60 and 61. Of course, it should be understood in this embodiment that in alternate coolant channels, coolant flows in the same direction but in adjacent coolant channels, coolant flows in opposite directions. Likewise, return header 36 is positioned to cover joint 31 and outlet openings 16. In this manner, fewer components can be used to construct the cooling arrangement thereby simplifying even further the fabrication of the TF coil.

In operation, coolant is flowed from an external source and through a manifold into the supply header. It travels along the supply header which is of a controlled shape so as to achieve proper coolant distribution, pressure drop and flow velocity and into coolant inlet openings 21. The coolant then flows through the bend portion 22 of the coolant channel, through the coolant channel 13. As illustrated in the adjacent coil 61, coolant then flows through the bend portion 15 of the coolant channel and to the outlet of the coolant channel 16 located on the flat face of the TF coil turn.

The coolant then flows along the flat face of the TF coil turn, through the return header 36 back to the coolant source through a manifold (not shown) which forms no part of the instant invention. TF coil assemblies built in accordance with this invention are of simplified design and manufacture, and produce good thermal and hydraulic properties with regard to coolant flow.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a tokamak reactor having a toroidal field coil assembly enclosing a generally toroidal shaped region having a toroidal axis, said toroidal field coil assembly comprising a plurality of generally flat-washer shaped magnetic coils having generally flat opposing radial faces with respect to said toroidal axis, a cooling arrangement for distributing coolant in said toroidal field coil assembly, said cooling arrangement comprising, for each coil:
   (a) a plurality of coolant channels for flowing coolant in the same direction through an interior of said coil, said coolant channels embedded within said coil and having inlets and outlets opening on a face of said coil,
   (b) said inlet and oulet openings disposed adjacent opposite ends of said coil and arranged radially along said coil face with respect to the toroidal axis,
   (c) a single inlet header formed in part by said coil face containing said inlet openings and in part by a curved supply conduit having a longitudinal opening along the length thereof,
   (d) a single outlet header formed in part by said coil face containing said outlet openings and in part by a curved return conduit having a longitudinal opening along the length thereof, and
   (e) said supply and return conduits each having longitudinal edges along their longitudinal openings, said edges being secured to respective portions of said coil face containing said inlet and outlet openings, such as by welding or brazing.

2. The cooling arrangement as recited in claim 1, wherein such supply header is tapered to decrease the cross-sectional flow area thereof with decreasing radial distance from said tokamak axis.

3. The cooling arrangement of claim 1, wherein said supply header is contoured to control the distribution of said coolant to said coolant inlets.

4. In a tokamak reactor having a toroidal field coil assembly enclosing a generally toroidal shaped region having a toroidal axis, said toroidal field coil assembly comprising a plurality of generally flat-washer shaped magnetic coils having generally flat opposing radial faces with respect to said toroidal axis, each coil having a leading and trailing end, the leading end of each coil connected to the trailing end of the immediately adjacent coil at a joint, a cooling arrangement for distributing coolant in said toroidal field coil assembly, said cooling arrangement comprising:
   (a) a plurality of coolant channels for flowing coolant in the same direction through an interior of said coils, said coolant channels embedded within said coil and having inlets and outlets opening on the faces of said coils,
   (b) said inlet and outlet openings disposed adjacent said leading and trailing ends of said coils and arranged radially along the coil faces with respect to the toroidal axis,
   (c) inlet openings of any given pair of coils disposed adjacent to one another along opposite sides of the joint joining said pair,
   (d) outlet openings of any given pair of coils disposed adjacent to one another along opposite sides of the joint joining said pair,
   (e) a single inlet header for each coil pair, said inlet header formed in part by said coil faces containing said inlet openings of each pair and the joint connecting said pair, and in part by a curved supply conduit having a longitudinal opening along the length thereof, said curved supply conduit covering the inlet openings and connecting joint of each pair,
   (f) a single outlet header for each coil pair, said outlet header formed in part by said coil faces containing said outlet openings of each pair and the joint connecting said pair and in part by a curved return conduit having a longitudinal opening along the length thereof said curved return conduit covering the oulet openings and connecting joint of each pair,
   (g) said supply and return conduits each having longitudinal edges along their longitudinal openings, said edges being secured to respective portions of said coil faces containing said inlet and outlet openings such as by welding or brazing.

5. In a tokamak reactor having a toroidal field coil assembly enclosing a generally toroidal shaped region having a toroidal axis, said toroidal field coil assembly comprising a plurality of generally flat-washer shaped magnetic coils having generally flat opposing radial faces with respect to said toroidal axis, a cooling arrangement for distributing coolant in said toroidal field coil assembly, said cooling arrangement comprising:
   (a) a first plurality of coolant channels for flowing coolant in a first direction through the interior of said coil,
   (b) a second plurality of coolant channels for flowing coolant in a second direction through the interior of said coil, said second direction opposite said first direction,
   (c) said first plurality of coolant channels having first openings on one face of said coil adjacent an end thereof, and second openings on the opposite face adjacent the other end thereof,
   (d) said second plurality of coolant channels having third openings on said opposite face of said coil adjacent the other end thereof, and fourth openings on said one face adjacent said opposite end thereof,
   (e) a first inlet header formed in part by said coil face containing said first openings and in part by a first curved supply conduit having a longitudinal opening along the length thereof,
   (f) a first outlet header formed in part by said coil face containing said second openings and in part by a first curved return conduit having a longitudinal opening along the length thereof, (g) a second inlet header having formed a header formed in part by said coil face containing said third openings and in part by a second curved supply conduit having a longitudinal opening along the length thereof, (h) a second outlet header formed in part by said coil face containing said fourth openings and in part by a second curved return conduit having a longitudinal opening along the length thereof, (i) said first and second supply conduits and said first and second return conduits each having longitudinal edges along their longitudinal openings, said edges being secured to respective portions of said coil faces containing said inlet and outlet openings, such as by welding or brazing.

6. The coil arrangement as recited in claim 5, wherein said first and second plurality of coolant channels are interlieved with one another such that adjacent channels in said coils carry fluid flowing in opposite directions.

7. In a tokamak reactor having a toroidal field coil assembly enclosing a generally toroidal shaped region having a toroidal axis, said toroidal field coil assembly comprising a plurality of generally flat-washer shaped magnetic coils having generally flat opposing radial faces with respect to said toroidal axis, each coil having a leading and trailing end, the end of each coil connected to the trailing end of the immediately adjacent coil at a joint, a cooling arrangement for distributing coolant in said toroidal field coil assembly, said cooling arrangement comprising:

(a) a first plurality of coolant channels for flowing coolant in a first direction through an interior of said coils, (b) a second plurality of coolant channels for flowing coolant in a second, opposite direction through the interior of said coils, (c) each of said first and second plurality of coolant channels having inlet and outlet openings on the faces of said coils, (d) said inlet and outlet openings disposed adjacent said leading and trailing ends of said coils and arranged radially along the coil faces with respect to the toroidal axis, (e) inlet openings of any given pair of coils disposed adjacent to one another along opposite sides of the joint joining said pair, (f) outlet openings of any given pair of coils disposed adjacent to one another along opposite sides of the joint joining said pair, (g) a single inlet header for each coil pair, said inlet header formed in part by said coil faces containing said inlet openings of each pair and the joint connecting said pair, and in part by a curved supply conduit having a longitudinal opening along the length thereof, said curved supply conduit covering the inlet openings and connecting joint of each pair.

(h) a single oulet header for each coil pair, said outlet header formed in part by said coil faces containing said oulet openings of each pair and the joint connecting said pair and in part by a curved return conduit having a longitudinal opening along the length thereof said curved return conduit covering the outlet openings and connecting joint of each pair, (i) said supply and return conduits each having longitudinal edges along their longitudinal openings, said edges being secured to respective portions of said coil faces containing said inlet and outlet openings such as by welding or brazing.

8. A cooling arrangement as recited in claim 7, wherein said first and second plurality of coolant channels are interlieved with one another such that adjacent channels in said coils carry fluid flowing in opposite directions.

* * * * *